UNITED STATES PATENT OFFICE.

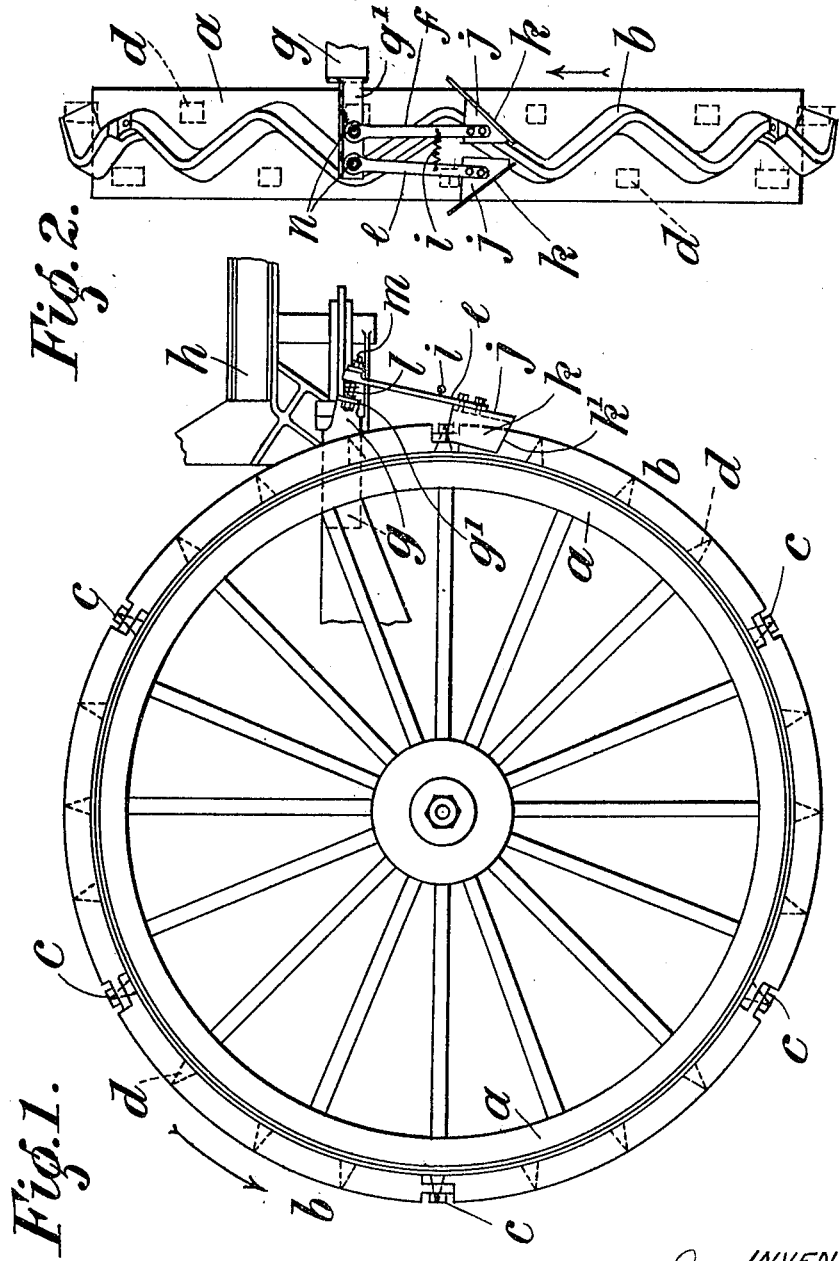

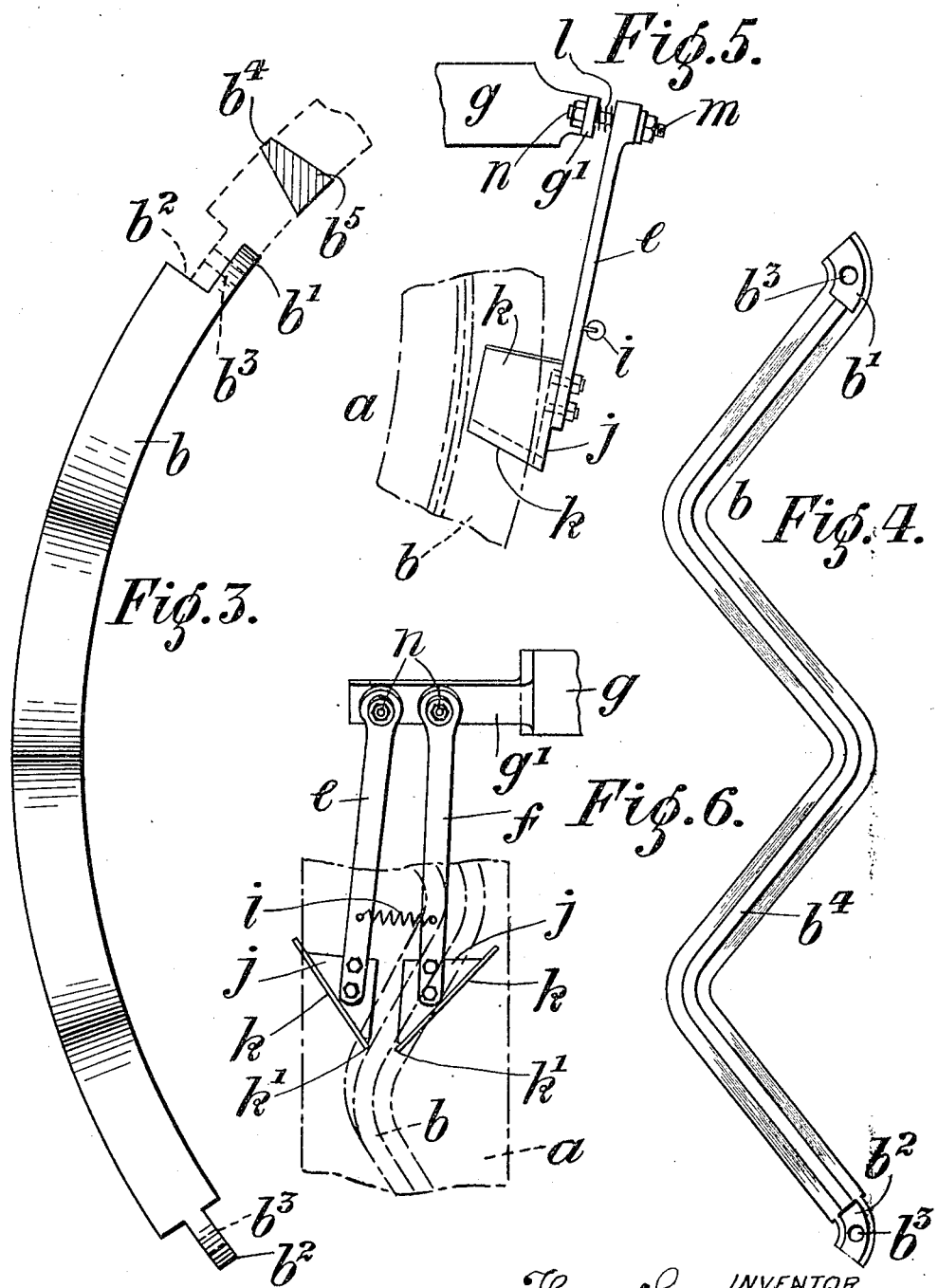

THOMAS GORDON RICHMOND, OF BRIDGE OF EARN, SCOTLAND, ASSIGNOR OF ONE-HALF TO DUNCAN McNAUGHTON WALLACE, OF GLASGOW, SCOTLAND.

TRACTION-WHEEL.

1,292,375. Specification of Letters Patent. Patented Jan. 21, 1919.

Application filed December 22, 1917. Serial No. 208,378.

*To all whom it may concern:*

Be it known that I, THOMAS GORDON RICHMOND, a subject of the King of Great Britain, residing at Bridge of Earn, Perthshire, Scotland, have invented certain new and useful Traction-Wheels, of which the following is a specification.

This invention relates to the traction wheels of heavy vehicles such as motor tractors, motor lorries, traction engines and the like, and all agricultural implements requiring spuds. At present, especially with heavy agricultural machines such as motor plows, binders, etc., the spuds or ribs on the peripheries of the driving wheels are very apt to gather up clay and earth and become choked so that the wheels lose their grip and tend to slip. In some cases it has been proposed to clean the spaces between the spuds or cross ribs by means of cleaning appliances but these have, so far, not been very satisfactory in practice especially in the case of machines operating on heavy clay soil.

The object of the present invention is to provide a novel form of spud or rib for the wheels and also a device whereby the same may be cleaned automatically and continuously as the machine travels over the soil.

Under this invention instead of making the wheels with the usual angled ribs or cross bars, or projecting studs, I provide the periphery of each of the wheels with a sinuous rib or spud. This sinuous rib or spud may be of any desired depth and thickness and would extend in a waved or zigzag line right around the periphery of the wheel the pitch being such as to give an effective grip on the soil and therefore tractive power to the wheels. The sinuous rib would be, preferably, made in six or other desired number of sections and be bolted or otherwise removably secured in place to the periphery of the wheel. There may be, opposite each wave depression, a stud or spud which, if the sinuous rib were removed, would enable the machine to run readily in the ordinary way.

There would be carried upon the machine in any suitable position relatively to each of the spud wheels an automatically acting cleaning device which would, preferably, take the form of two scrapers, one arranged at each side of the sinuous rib, each scraper being provided with an arm pivotally secured to the machine frame in such manner that the scrapers could swing from side to side and adapt themselves to the sinuosities of the spud as the wheel revolved. A spring, or springs, or an equivalent device, could be used to hold the scrapers in contact with the sinuous spud.

If desired, instead of having two separate scrapers, working together, as aforesaid, there might be a single scraper with a single arm and single pivot a sufficiently broad gap being left between the scrapers to allow of them acting properly on the sinuous spud.

The scrapers may be arranged at any suitable angle and they may be pivoted and mounted in any suitable fashion the idea being, in all cases, for the scraper or scrapers to follow the windings of the sinuous spud and thoroughly scrape the same and the wheel thereby preventing clay and earth accumulating between the waves and so detracting from the effective tractive effort of the machine.

In the case of a very wide wheel more than one sinuous spud or rib may be attached with a corresponding number of scrapers.

This sinuous spud need not be removed when the wheels have to travel on a road or hard surface.

The invention is particularly suitable for motor or steam plows and other heavy motor or steam driven agricultural machines.

In order that the invention may be clearly understood I have hereunto appended explanatory sheets of drawings whereon I have shown, by way of example, one mode of carrying the invention into effect or practice.

Figure 1 is an elevation of a motor tractor wheel with the sinuous spud and scraper arrangement.

Fig. 2 is an end view of the wheel and the scraper arrangement.

Fig. 3 shows, in side view, and Fig. 4, in plan view (expanded) a section of the sinuous spud.

Fig. 5 is a side elevation, and

Fig. 6 a plan of the scraper arrangement.

As will be seen, in the construction shown on the drawings, the wheel *a* has a sinuous spud *b* right around its periphery this spud being preferably made in six sections, one of which is shown to an enlarged scale in Figs. 3 and 4. These sections are bolted to the wheel by bolts *c* and, to enable this to be done, each section, as shown in Figs. 3 and 4, is made with lugs $b^1$, $b^2$, which engage with the corresponding lugs in the next sections and the bolts are passed through holes $b^3$ in these lugs. By bolting the sections in this manner they can be readily fitted to a wheel or removed therefrom. Each section, as will be seen from Figs. 3 and 4, is of a sinuous or zigzag shape with the actual tread surface $b^4$ narrower than the base of the spud the cross section of which is as shown at $b^5$, Fig. 3. If so desired there may be arranged on the wheel periphery, at each side of the spud, a series of pointed studs $d$, as shown in dotted lines at Figs. 1 and 2.

The scraper arrangement may, as shown clearly in the enlarged views at Figs. 5 and 6, consist of two arms $e$, $f$, pivotally secured by bolts $n$ to the lug $g^1$ of the bracket $g$ secured to the tractor frame $h$ in any suitable manner. Each of these arms carries, at its lower end, a holder $j$ to which steel scrapers $k$ are removably secured, these scrapers being arranged at an angle, as shown at Fig. 6, and also being angled at their edges $k^1$ to correspond with the angled sides of the spud itself. A spring $l$ may be on the bolt $n$, between each arm and the lug $g^1$ of the bracket $g$ so that, by tightening the nut $m$, the scrapers can be kept up to their work as they wear away. The two arms are bound resiliently together by a spring $i$.

As will be seen, in Fig. 2, the angularity of the scrapers $k$ is such that as the wheel rotates in the direction of the arrow, clay or dirt is scraped off the wheel and the spud and thrown off to either side.

Having now fully described my invention what I claim and desire to secure by Letters Patent is:

1. A vehicle wheel having a sinuous spud around its periphery and two pivotal scrapers resiliently bound together and adapted to scrape the wheel at each side of the spud, substantially as described.

2. A traction wheel having a sinuous spud at its periphery, pivotally supported scrapers to engage opposite sides of said spud, and a single spring to cause each scraper to bear against said spud.

3. A traction wheel having a sinuous spud at its periphery, arms pivotally supported, holders on said arms, a scraper angularly disposed on each arm, and resilient means to move said arms toward said spud.

4. A traction wheel, having at its periphery a sinuous spud wider at its base than at its tread, arms pivotally supported, holders on said arms, scrapers angularly disposed on said holders and having the edges presented to said spud corresponding in contour to the juxtaposed side wall of the spud, and a tension device for said arms.

In testimony whereof I affix my signature in presence of two witnesses.

THOMAS GORDON RICHMOND.

Witnesses:
    HUGH D. FITZPATRICK,
    WILLIAM GALLO.